April 19, 1932.   A. VAN DUYN   1,854,678
WEIGHING APPARATUS
Filed Jan. 18, 1930   2 Sheets-Sheet 1
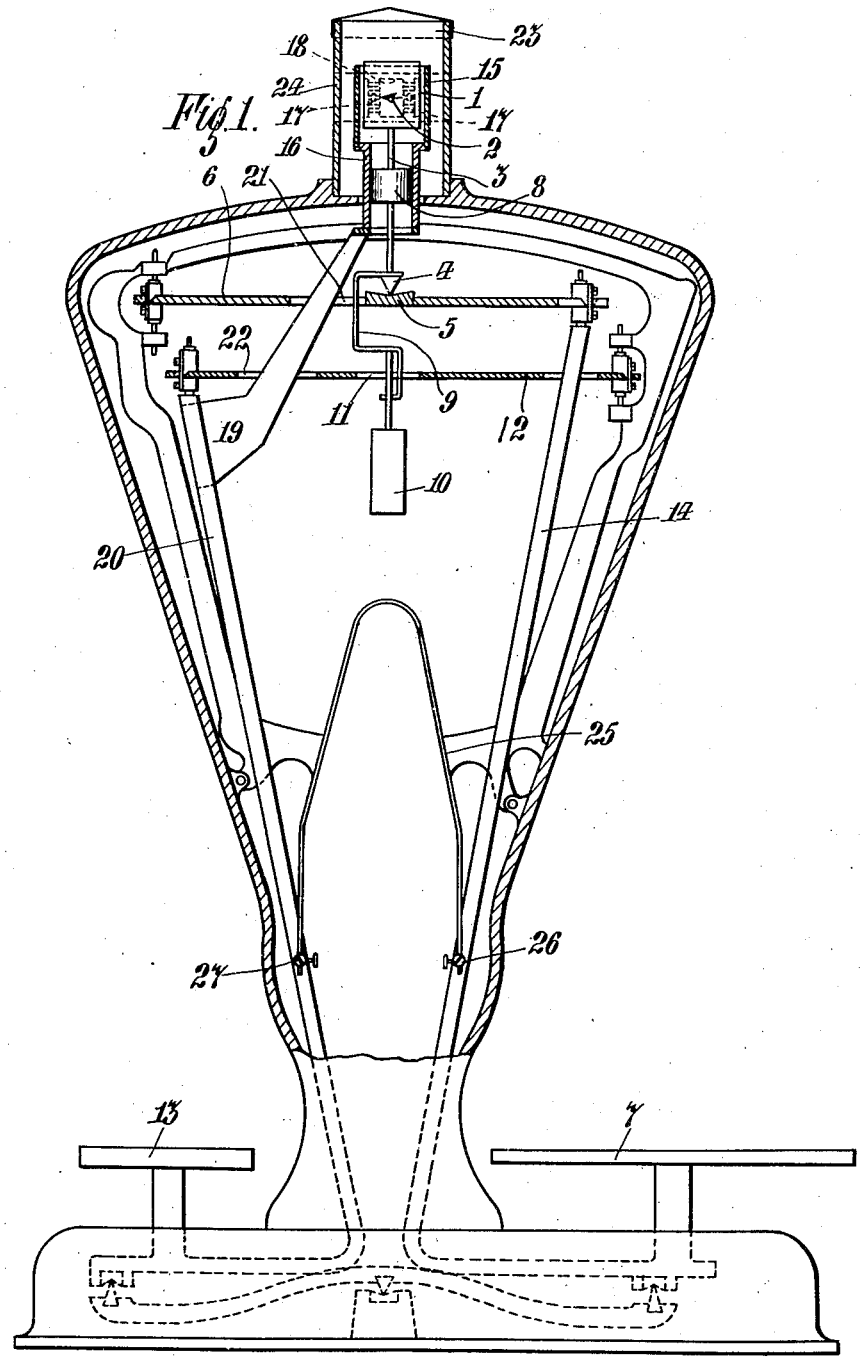

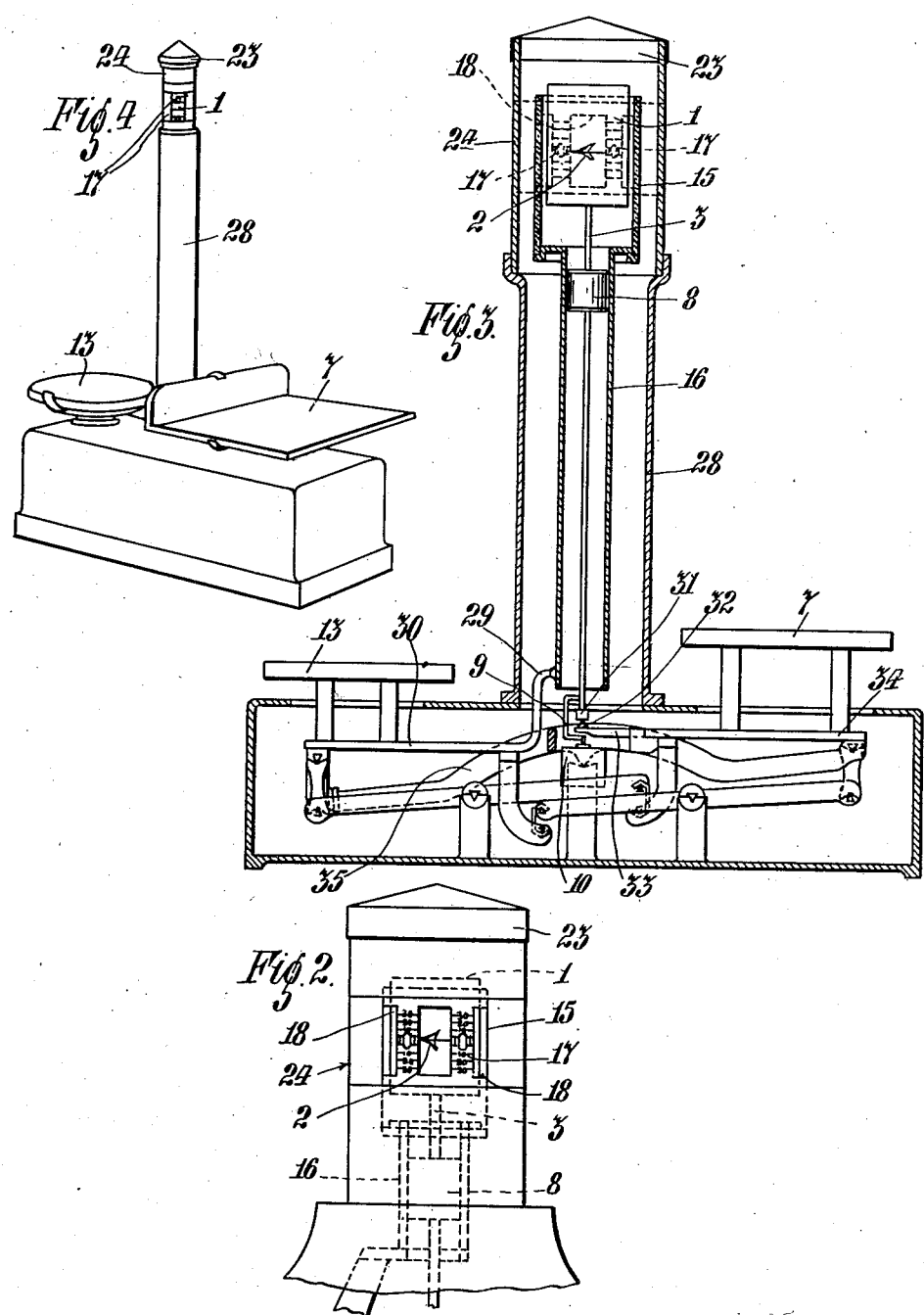

Patented Apr. 19, 1932

1,854,678

UNITED STATES PATENT OFFICE

ADRIANUS VAN DUYN, OF HILLEGERSBERG, ROTTERDAM, NETHERLANDS, ASSIGNOR TO N. V. MAATSCHAPPIJ TOT VERVAARDIGING VAN SNIJMACHINES VOLGENS VAN BERKEL'S PATENT EN VAN ANDERE WERK TUIGEN, OF ROTTERDAM, NETHERLANDS, A LIMITED LIABILITY COMPANY OF THE NETHERLANDS

WEIGHING APPARATUS

Application filed January 18, 1930, Serial No. 421,694, and in Great Britain July 24, 1929.

This invention relates to automatic or semi-automatic weighing apparatus having a chart or charts carrying weight, price and/or other indications and an index or reading line or lines, and has particular reference to the so-called over-and-under weight scales.

The object of the present invention is to provide an improved construction and arrangement of chart and index or reading line.

According to the invention, I provide weighing apparatus having an index line or lines and a chart body, either the chart body or the index line or lines, or both the said body and line or lines, being movable by the weighing mechanism and so made that the weight, price and/or other indications are visible to the buyer and/or seller at all positions around the weighing apparatus.

According to a further feature of the invention, I provide weighing apparatus with a plurality of charts or sets of indications or markings formed as, or provided on, a cylinder or other body with parallel outlines, either the said cylinder or body, or the corresponding index line or lines, or both the said body and the said line or lines, being movable by the weighing mechanism and so arranged that the weight, price and/or other indications are visible to the buyer and/or seller at all positions around the weighing apparatus.

The index line may be constituted by a wire, strip or other member, or be provided on a cylinder or other body with parallel outlines, located either outside or inside round the chart cylinder or body and may be a short distance, as usual, from the corresponding chart. When the index line is located inside the chart cylinder or body, the latter is made of transparent material or with suitable transparent or open parts.

If necessary, or desirable, the index line can be interrupted at one or more places. The index line and/or chart are or is arranged vertically or substantially vertically or are or is otherwise so made and arranged that the weight, price and/or other readings can be taken at every position of the buyer and/or seller around the weighing apparatus.

The chart body aforesaid and the index line is or may be relatively movable in the direction of the axis of the chart body. The chart body and/or index line may be movable axially of the said body by means connected directly or indirectly with the parallel guiding means of the weigh pans or other moving part of the weighing mechanism. Thus, the vertical or substantially vertical chart body and index line may be used in conjunction either with parallel guiding means disposed in a base casing, as is the Béranger system, or with parallel guiding means disposed in a fan shaped or other casing superposed on a base casing, as in the Roberval system. In the former case, the chart body and the body or member constituting or carrying the index line, are located at the top of a cylindrical or other vertical pillar mounted on the top or other part of the base casing or base plate. As will be understood, this pillar construction enables a clear view of the weigh plans to be obtained from practically all positions around the apparatus. In the second case, the chart body, and the body or member constituting or carrying the index line, project upwards from the top of a casing of fan or thistle shape, which, as in the case of the pillar construction aforesaid, is likewise mounted on the top or other part of the base casing or base plate.

The chart body may be of tubular or prismatic form and of circular or of triangular, hexagonal or other polygonal cross section. The member constituting or carrying the index line may be of cylindrical, ring or like shape adapted to extend round, with or without interruption, the outside or inside of the said chart body.

In an embodiment of the invention, as applied to weighing apparatus having parallel guiding means located in the base casing or in a fan shaped casing above the base casing, the chart body is preferably connected directly or indirectly to the usual check arm or check link of one of the weigh pans, whilst the index body or member is, in such case, connected directly or indirectly to the check arm or check link of the other weigh pan.

In order that the invention may be clearly understood and readily carried into practice, two embodiments thereof will now be described, by way of example, with reference to the annexed drawings, in which:—

Fig. 1 is a partly sectioned elevation of a weighing scale embodying the use of my improved chart and index line with parallel guiding means in an upstanding indicator casing.

Fig. 2 is an enlarged exterior view of the index line and chart by themselves.

Fig. 3 is a vertical section of a weighing scale embodying the use of my improved chart or index line with parallel guiding means arranged in the base casing.

Fig. 4 is a perspective view on a reduced scale of the embodiment shown in Fig. 3.

Referring to Figs. 1 and 2 of the drawings:—

A cylinder 1 is marked with horizontal arrows 2 of which four or other number are spaced at equal intervals from one another round the cylinder 1 and constitute the index line of the apparatus. The cylinder 1 is fixed to the top of a rod 3 of which the lower end is provided with a knife edge or point 4 resting on a bearing 5 on the upper side of the check link 6 of the load pan 7. The rod 3 is provided at its middle portion with a piston-shaped guide 8 and has secured to its bottom end a hanger 9 supporting a depending weight 10 adapted to keep the rod 3 exactly vertical. Apertures 11 are provided in the check link 12 of the weights pan 13 so as to permit the passage therethrough of the hanger 9 and the check arm 14 of the load pan 7.

The numeral 15 denotes the chart body, which is in the form of a hollow glass sleeve or cylinder supported at its lower end on the head of a sleeve 16 surrounding the piston shaped guide 8 of the index cylinder 1. The upper end of the chart cylinder 15 is marked or fitted with four or like number of vertical weight and/or price charts 17 (see Fig. 2) spaced around the chart cylinder 15 at equal intervals from one another, with which charts 17 the arrows 2 of the index cylinder 1 are adapted to co-operate. In order to render the index arrows 2 visible to the buyer and/or seller, the portions of the chart cylinder 15 located between the vertical weight and/or price charts 17 are left transparent as at 18 (Fig. 2). The sleeve 16 carrying the chart cylinder 15 is mounted at its lower end on a bracket 19 secured to the upper end of the check arm 20 carrying the check link 12, which latter is not connected with nor acts upon the operating rod 3 of the index cylinder 1. Apertures 21 and 22 are provided in both check links 6 and 12 respectively so as to permit unimpeded vertical movement of the bracket 19.

Both the index cylinder 1 and chart cylinder 15 are enclosed within a common cylindrical cap 23, the cylindrical or side wall 24 of which is made wholly or partly of glass.

The check arms 6 and 12 are interconnected by a leaf or other spring member 25 of inverted V or other shape adapted to ensure balanced action, the ends of the spring member being secured to the respective check arms 6 and 12 by binding screws 26 and 27.

Referring to Figs. 3 and 4 of the drawings:—

The index cylinder 1 and chart cylinder 15 are constructed and arranged similarly to those shown in Figs. 1 and 2, the operating rod 3 and the reduced sleeve 16 being made of relatively greater length so as to extend completely down the hollow pillar 28. In this embodiment, the parallel guiding means of the weigh pans is located entirely in the base casing (termed the Béranger system) in contrast to the disposition of the parallel guiding means in a casing superposed above the base casing (the Roberval system), but the lower end of the sleeve 16 is connected by an arm to the check arm 30 of the weights pan 13 and the lower end of the rod 3 terminates in a bearing 31 which rests on a knife edge 32 carried by an extension 33 of the check arm 34 of the load pan 7. As in the embodiment described with reference to Figs. 1 and 2, the rod 3 is provided intermediate its ends with a piston-shaped guide 8 and has secured to its bottom end a hanger 9 supporting a depending weight 10 adapted to keep the rod 3 exactly vertical. The numeral 35 denotes the weigh beam of the weighing mechanism, which does not call for description inasmuch as it is well known per se.

The hollow pillar 28 is provided with a cap 23 surmounting a cylindrical wall 24, which is wholly or partly made of glass so as to render the index arrows 2 and charts 17 visible to the buyer and/or seller at all positions around the apparatus. As will be apparent from Fig. 4, the pillar construction enables a clear view of the load pan 7 and weights pan 13 to be obtained from practically all positions around the apparatus, whilst also allowing the maximum amount of light to reach the said pans.

Obviously other modifications will occur to those skilled in the art to which this invention pertains without departing from the spirit of this invention and I therefore do not wish to limit my invention except as set forth in the appended claims. The main feature of the indicating means being that the inner and outer cylinders move relatively to each other and due to the transparent portions of the cylinder, the readings are clearly visible.

I claim:—

1. Weighing apparatus comprising weighing mechanism, of a vertical chart cylinder having alternate vertical graduated and transparent portions, an index cylinder located inside said chart cylinder, and means whereby said chart cylinder and index cylinder are relatively movable axially by said weighing mechanism.

2. Weighing apparatus comprising weighing mechanism, a chart cylinder having alternate chart and transparent portions, an index element for said chart cylinder, supporting means carrying said chart cylinder and index element, and means whereby said chart cylinder and index element are relatively movable by said weighing mechanism through said supporting means.

3. Weighing apparatus comprising weighing mechanism having weigh pans, an index element and a chart element each visible at all positions around said apparatus, parallel guiding means for said weigh pans, and means whereby said chart element and index element are relatively movable by said parallel guiding means.

4. Weighing apparatus comprising weighing mechanism having weigh pans, an upwardly projecting index element, a chart element coaxially arranged with said index element, parallel guiding means for said weigh pans, and means whereby said chart and index elements are relatively movable axially of each other by said parallel guiding means.

5. In a weighing apparatus the combination with weighing mechanism enclosed in a base casing and provided with weigh pans, of an index element, a chart element, parallel guiding means disposed in said base casing for guiding said weigh pans, a hollow vertical pillar mounted on said base casing, and means whereby said chart and index elements are relatively movable by said parallel guiding means and so supported thereby as to project upwards from said pillar and be visible at all positions around said apparatus.

6. In a weighing apparatus the combination with weighing mechanism enclosed in a base casing and provided with weigh pans, of a vertical index element, a vertical chart cylinder co-axial with said index element, parallel guiding means for said weigh pans, a hollow vertical pillar mounted on said base casing, and means whereby said chart cylinder and index element are vertically movable relatively to each other by said parallel guiding means and are so supported thereby as to project from the top of said pillar.

7. Weighing apparatus comprising weighing mechanism, an index cylinder provided with index pointers, a transparent tubular chart element arranged co-axially outside said index cylinder, and means whereby said chart element and index cylinder are relatively movable by said weighing mechanism and so supported as to make visible the reading of said elements from all positions around said apparatus.

8. In a weighing apparatus the combination with weighing mechanism of an index element, of a chart element arranged co-axially with said index element, means whereby said chart and index elements are relatively movable by said weighing mechanism and are so supported as to be visible from all positions around said apparatus, and a pendulously weighted guide for maintaining said chart and index elements in vertical position.

9. Weighing apparatus comprising weighing mechanism having weigh pans, vertical interprojecting chart and index elements, parallel guiding means for said weigh pans, means whereby said chart and index elements are vertically movable relatively to each other by said parallel guiding means, and a pendulously weighted device for maintaining said chart and index elements vertical while permitting the relative vertical movement thereof.

10. In a weighing apparatus the combination with weighing mechanism, of an index element and a chart element each visible at all positions around said apparatus, supporting means whereby said chart and index elements are each so supported as to render visible the reading of said elements from all positions around said apparatus, operating means whereby the supporting means of said chart and index elements are relatively movable by said weighing mechanism, and spring means adapted to insure balanced action of the operating means of said chart and index elements.

11. In a weighing apparatus the combination with weighing mechanism having weigh pans, of a vertical index cylinder, a transparent vertical chart cylinder, parallel guiding means for each of said weigh pans, means whereby said chart and index cylinders are vertically movable relatively to each other by said parallel guiding means and a yielding means connecting the parallel guiding means of one weigh pan to the parallel guiding means for the other pan.

12. Indicating mechanism for weighing apparatus comprising a hollow tubular casing having a transparent portion, a member arranged within said hollow tubular casing and adapted to move longitudinally therein and having a portion thereof arranged to move in close proximity to said transparent portion, means adapted to be operatively connected to the weighing apparatus to impart relative movement to said member and casing, and cooperating indices on said transparent portion of said casing and the adjacent portion of said member for indicating a function of the load placed on said weighing apparatus.

13. A weighing apparatus comprising an index means, and indicating means for co-operation with said chart both mounted for movement with movable parts of said weighing apparatus, one of said means being movable within the other means and co-operating therewith to indicate a function of the article being weighed.

14. A device as claimed in claim 13 in which said first member is provided with additional transparent portions and in which additional index means are provided on said members.

15. In a weighing apparatus, the combination with a weighing mechanism and indicating means co-operating with said weighing mechanism comprising an outer casing having transparent portions therein, a member slidable within said casing and having index means thereon co-operating with index means on said casing and visible through said transparent portions of said casing, and a guiding member guided within said casing and connected to said first mentioned member for guiding said first mentioned member in its movement relative to said casing.

16. In a weighing apparatus, the combination of weighing mechanism and indicating means operatively connected therewith comprising an outer cylindrical casing having transparent portions, an inner cylindrical member slidable within said casing and visible through said transparent portions of said casing, and means for guiding said inner cylindrical member for longitudinal movement substantially parallel to the axis of said casing, said casing and transparent portions having co-operating index means thereon for indicating a function of the load being weighed.

17. In a weighing apparatus, the combination with weighing mechanism having a movable member responsive to movements of said weighing mechanism when a load is placed on said weighing apparatus, a bearing on said movable member, a cylindrical member pivotally supported by said movable member, a casing for said cylindrical member, and co-operating index means on said casing and cylindrical member, said cylindrical member and casing being movable relative to each other in response to load variations on said weighing apparatus.

18. A device as claimed in claim 17 in which the pivotal mounting of said cylindrical member on said movable member comprises a weighted member for holding said cylindrical member in a substantially vertical position and in which said cylindrical casing is provided with a bearing surface co-operating with a bearing surface connected to said cylindrical member so that said cylindrical member will be guided properly within said casing as said casing and cylindrical member move relatively to each other in a direction longitudinally of their axes.

19. In a weighing apparatus, the combination with a casing, of an opening in said casing, a transparent dust-proof housing adjacent said opening, a cylindrical casing within said dust-proof housing, said casing having transparent portions, a cylindrical member within said casing, co-operating index means on said cylindrical member and casing visible from all points about said weighing apparatus due to said transparent housing and said transparent portions on said casing, and means for moving said cylindrical member and casing relative to each other longitudinally of their axes in response to the movements of the weighing apparatus due to load variations.

In testimony whereof I affix my signature.

ADRIANUS van DUYN.